UNITED STATES PATENT OFFICE.

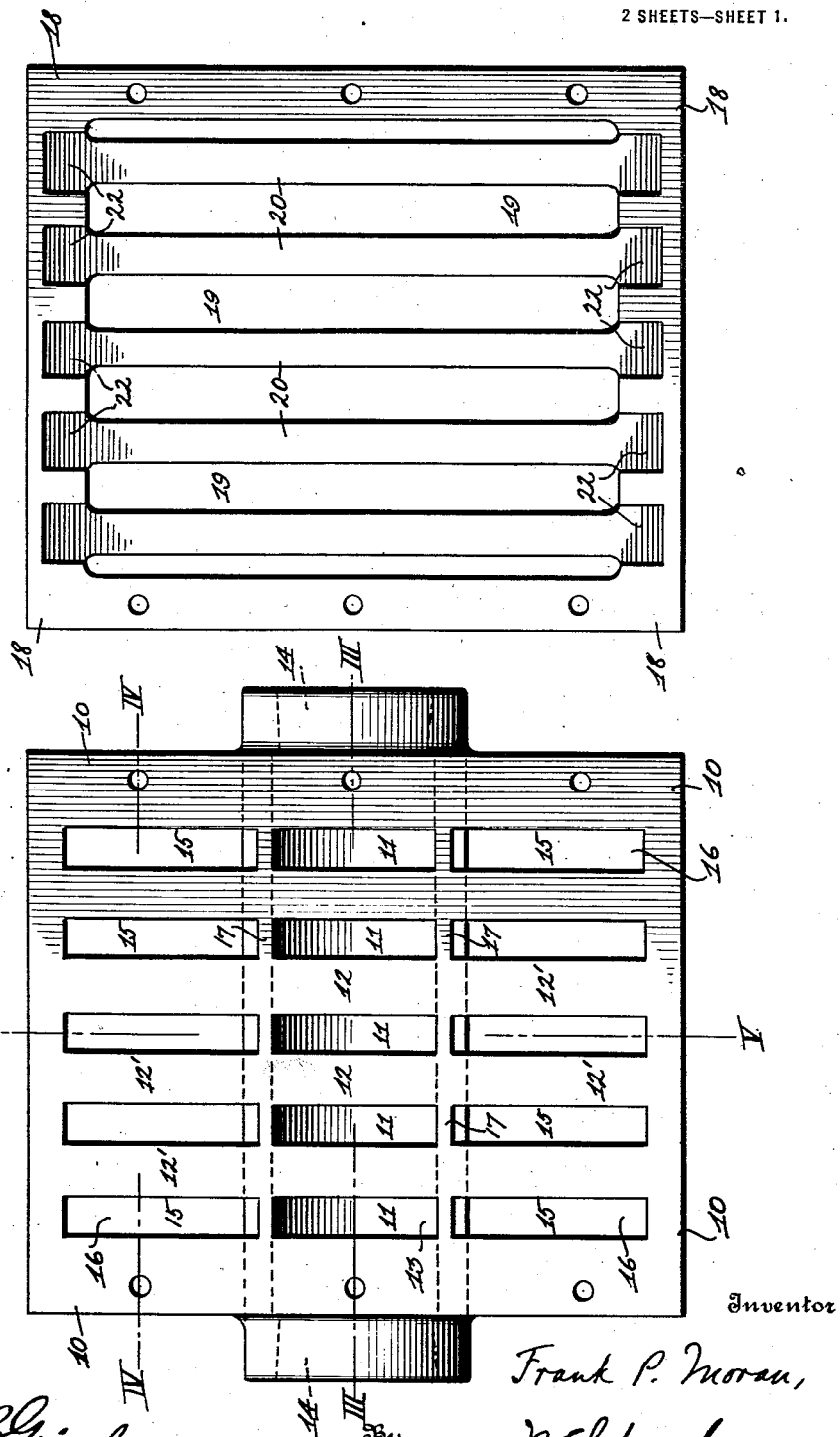

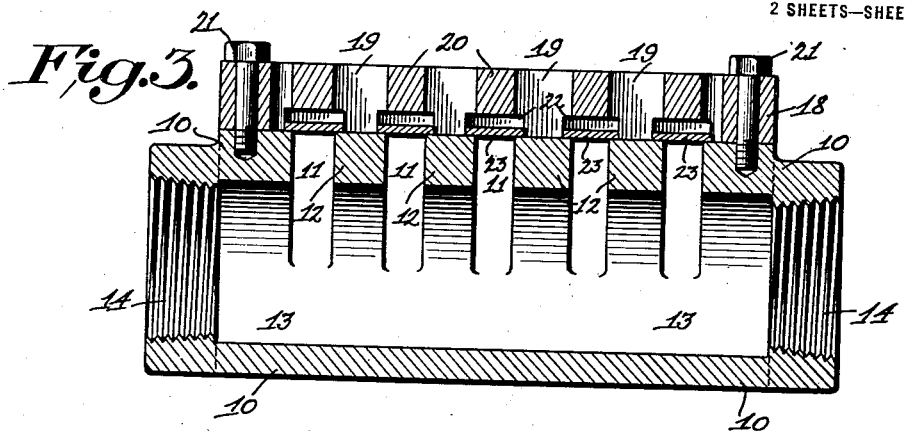
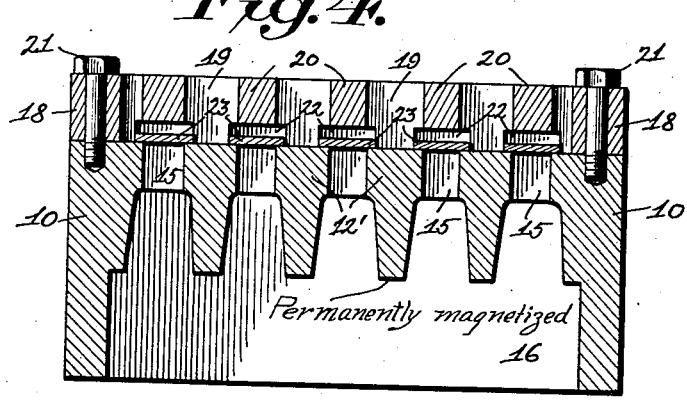
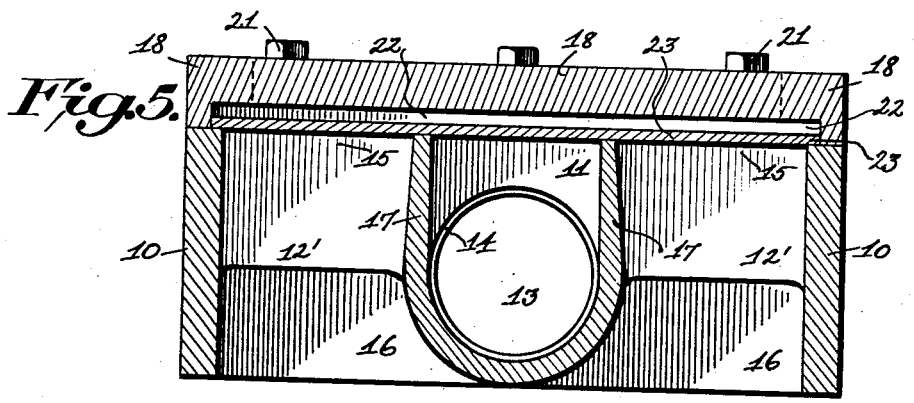
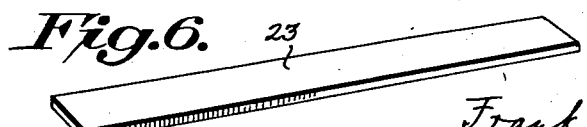

FRANK P. MORAN, OF CINCINNATI, OHIO.

VALVE.

1,319,787.   Specification of Letters Patent.   Patented Oct. 28, 1919.

Application filed January 30, 1919. Serial No. 273,975.

*To all whom it may concern:*

Be it known that I, FRANK P. MORAN, a citizen of the United States, residing at Cincinnati, in the county of Hamilton and State of Ohio, have invented new and useful Improvements in Valves, of which the following is a specification.

My invention relates to valves and more particularly to the class called check valves of the automatic plate type which are peculiarly adapted to be used in connection with any fluid or gas distribution apparatus, gas engines, blowers, compressors, or pumps.

The objects of my invention are to construct a valve of the character above referred to which is adapted to be used, if so desired, in connection with or operate upon a plurality of fluids or gases and devised to eliminate all springs, and be most reliable and efficient in its action under all and varied conditions of operation.

A further object of the invention is to form a valve of the class above pointed out which comprises a simplicity of and a minimum number of parts, low cost of production, easily assembled or taken apart, and no parts subjected to bending, torsional or tensile stresses, thereby not only increasing the life of the valve but at the same time insuring the constant and uniform operation of the same under all fluctuations of pressure and velocity of the gases or fluids in passing through the valve.

Other objects of the invention will appear from the detailed description of the construction and operation of the valve to be hereinafter given.

The invention consists of structural characteristics and relative arrangements of elements which will be hereinafter more fully described and particularly pointed out in the appended claims.

In the two sheets of drawings in which similar reference characters indicate the same parts in the several figures, Figure 1 is a plan view of the valve seat, Fig. 2 is a plan view of the interior of the cover or valve guide, Fig. 3 is a sectional view taken on line III—III of Fig. 1, Fig. 4, is a sectional view taken on line IV—IV of Fig. 1, Fig. 5 is a sectional view taken on line V—V of Fig. 1, and Fig. 6 is a perspective of one of the valve plates.

In the drawings 10 represents the valve seat which as shown is preferably made rectangular or square in form but any other shape or contour, as circular may be adopted without departing from the essential features of the invention.

Said seat 10 is provided with a series of central ports 11, 11 separated by bridge sections 12, 12, said ports communicating with an inclosed middle chamber 13 having inlets 14, 14, either one of which inlets may be plugged or closed if so desired.

In said seat 10 and on each side of the ports 11, 11, and in line therewith, are provided other ports 15, 15, separated by bridges 15', 15', which ports lead to lateral chambers 16, 16, open preferably at their bottom and arranged on each side of the chamber 13, said chambers 13 and 16, being separated by walls 17, 17 as shown in Fig. 5.

18 is a valve guide plate or cover which likewise is provided with a series of separated ports or slots 19, 19, and bridge sections 20, 20, and is secured by means of properly arranged screws or bolts 21, 21 to the top of the valve seat 10, in such a position that its ports 19, 19, are disposed between the ports 11, 11 or over the solid metal bridges or sections 12, 12 in the top of the valve seat 10, as clearly shown in Figs. 3 and 4, thus bringing the solid or bridge sections 20, 20 of the valve guide plate or cover 18 properly over the ports 11 and 15 of the valve seat 10, and arranging the ports 19 with respect to the ports 11 and 13 in a staggered relation.

On the underside and opposite ends of the bridges 20, 20, of the valve guide plate or cover 18 and corresponding to the alinement of the ports 11, 15 of the valve seat 10, are cut or cast a series of shallow recesses 22, 22 as shown in Figs. 2, 3 and 4, opposite recesses of which are adapted to loosely receive a flexible and yielding valve plate 23, shown in detail in Fig. 6, for purposes to be presently disclosed, and while the ends of the valve plates 23 are shown square or rectangular in shape and the coöperating recesses 22, 22 are correspondingly formed, any other shape as semi-circular, may be readily substituted without departing from the spirit or changing the operation of the invention.

For the purpose of quickly drawing the valve plates 23, 23 toward and firmly holding them against the seat 10 after the same has been lifted and uncovered the ports 11 and 15, said seat 10 may be magnetized, and the valve guide plate 18 is accordingly made of some non-magnetic material, when the plates 23, 23, will act as a series of armatures which are first lifted by the fluid or gas passing through the valve and then instantly drawn back by the magnetic action of the valve seat 10, thereby insuring a quicker and tighter closing of the valve during the operation of the same.

The ports of the valve being arranged as shown in Figs. 3 and 4, the operation is as follows:—

The chamber 13 by means of inlets 14 and chamber 16 by means of its lower openings being in communication with and connected to supplies of fluid or gas, when an exhaust action is effected in the upper face of the valve guide plate 18, tending to draw said fluid or gas through the valve, the flexible valve plates 23, 23 are simultaneously and uniformly lifted from the seat 10 until they abut against the underside of the bridges 20, 20, of the plates 18, thus permitting the fluids or gases to be drawn from the chambers 13 and 16 through the ports 11 and 15 into the ports 19, 19 to be thoroughly mixed and carried to the point of consumption, and as soon as the suction ceases and the pump or flow of the liquid or gas is reversed, said flexible plate valves 23 are quickly and tightly seated against the seat 10 and over the ports 11 and 15, due to their flexibility thereby insuring not only a quick action of the valve but at the same the minimum per cent. of leakage or slippage due to the very low lift or movement of the valve plates and their capability to yield to the exact contours or planes of the valve seat at each of the ports 11 and 15. While I have shown my valve as adapted to be used in connection with two fluids or gases, the same is readily adapted to be operative in connection with one or a plurality of fluids or gases and can be used in any position whether vertical, horizontal or at an angle.

From the foregoing disclosure of the construction and operation of the valve, it will be readily seen that all the objects of the invention previously pointed out have been fully carried out and no parts of the valve are subjected to bending stresses, entirely free in action without friction or other disturbing forces and capable of acting upon only one gas, air or liquid, or mixing two or more gases or liquids.

What I claim is:—

1. A mixing valve comprising a valve seat having a series of ports and a plurality of separate and independent chambers communicating with one of the open ends of said ports, a valve plate guide superimposed on said valve seat and contiguous to the other open ends of said valve seat ports and having a series of ports in communication with said valve seat ports, a series of independent valve plates loosely and freely interposed between said valve seat and valve plate guide and so constructed and arranged as to be adapted to be firmly seated on the valve seat over each of the valve seat ports, or lifted against the underside of the valve plate guide to establish communication with the valve seat ports and ports of the valve plate guide and said chambers.

2. A mixing valve comprising a magnetized valve seat having a series of ports and a plurality of separate and independent chambers communicating with one of the open ends of said ports, a non-magnetic valve plate superimposed on said valve seat and contiguous to the other open ends of said valve seat ports and having a series of ports in communication with said valve seat ports, a series of independent valve plates loosely and freely interposed between said valve seat and valve plate guide and so constructed and arranged as to be adapted to be attracted by and firmly seated on the valve seat over each of the valve seat ports, or lifted against the underside of the valve plate guide to establish communication with the valve seat ports and ports of the valve plate guide and said chambers.

3. A mixing valve comprising a valve seat having a plurality of ports and a plurality of separate and independent chambers communicating with one of the open ends of said ports, a valve plate guide superimposed on said valve seat and contiguous to the other open ends of said valve seat ports and having a plurality of ports in staggered relation with respect to and communicating with said valve seat ports, and bridges provided with recesses over said valve seat ports, a plurality of independent and flexible valve plates loosely and freely interposed between said valve seat and valve plate guide and fitting in said recesses and so constructed and arranged as to be adapted to be firmly seated on the valve seat over each of the valve seat ports, or lifted against the underside of the valve plate guide to establish communication with the valve seat ports and ports of the valve plate guide and chambers.

4. A mixing valve comprising a valve seat having a plurality of series of separated and independent ports and a plurality of independent chambers each of which communicates with one of the open ends of one of the series of ports, a valve plate guide superimposed on said valve seat and contiguous to the other open ends of said valve seat ports and having a plurality of ports in staggered relation with respect to and communicating with said valve seat ports, a plurality of separated and independent valve plates loosely and freely interposed between said valve seat and valve plate guide and so constructed and arranged as to be adapted to be firmly seated on the valve seat over each of the separated valve seat ports, or lifted against the underside of the valve plate guide to establish intercommunication between the valve seat ports and ports of the valve plate guide and chambers.

In testimony whereof I affix my signature.

FRANK P. MORAN.